US006973419B1

(12) United States Patent
Fortin et al.

(10) Patent No.: US 6,973,419 B1
(45) Date of Patent: *Dec. 6, 2005

(54) METHOD AND SYSTEM FOR DESIGNING AN IMPINGEMENT FILM FLOATWALL PANEL SYSTEM

(75) Inventors: Thomas B. Fortin, Lauderhill, FL (US); Gregory E. Chetta, Palm Beach Gardens, FL (US); David W. Leung, Hollywood, FL (US); Duncan C. Meyers, Bolton, CT (US); Keith C. Belson, Lawrence, SC (US); John V. Diaz, Southington, CT (US); Thomas E. Holladay, Lake Park, FL (US); Scott A. Ladd, Coventry, CT (US); Randall G. McKinney, Ellington, CT (US); Sergio Rinella, West Palm Beach, FL (US); Andreas Sadil, Newington, CT (US); George F. Titterton, III, South Windsor, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/517,567

(22) Filed: Mar. 2, 2000

(51) Int. Cl.[7] .............................................. G06G 7/48
(52) U.S. Cl. ................ 703/8; 703/8; 60/757; 60/752; 60/755; 60/756; 60/760; 701/477; 477/30
(58) Field of Search ............................................ 703/8

(56) References Cited

U.S. PATENT DOCUMENTS 4,622,821 A  11/1986  Madden .................... 60/757

(Continued)

OTHER PUBLICATIONS

Mavirs et al., "A Methodology for Robust Design of Implementation Cooled HSCT Combustor Liners" George Tech School of Aeorspace Engineering. 1997p. 1-11.*

(Continued)

Primary Examiner—Kevin J. Teska
Assistant Examiner—Tom Stevens
(74) Attorney, Agent, or Firm—McCormick, Paulding & Huber LLP

(57) ABSTRACT

A method and system for designing an impingement film floatwall panel system for a combustion chamber for a gas turbine engine comprising the steps of creating an impingement film floatwall panel knowledge base of information. The knowledge base has a plurality of design rule signals with respect to a corresponding plurality of parameter signals of associated elements of impingement film floatwall panels for a combustion chamber, wherein the knowledge base comprises at least one data value signal for each one of the plurality of design rule signals. The steps also include entering a desired data value signal for a selected one of the plurality of parameter signals of an associated element of the impingement film floatwall panels and comparing the entered desired data value signal for the selected one of the plurality of parameters with the corresponding at least one data value signal in the knowledge base for the corresponding one of the plurality of design rule signals. If the result of the step of comparing is such that the entered desired data value signal for the selected one of the plurality of parameter signals is determined to have a first predetermined relationship with respect to the corresponding at least one data value signal in the knowledge base for the selected one of the plurality of design rule signals, create signals representative of a geometric representation of the selected one of the plurality of parameter signals of the associated element of the impingement film floatwall panels.

25 Claims, 10 Drawing Sheets

U.S. PATENT DOCUMENTS 4,653,279 A * 3/1987 Reynolds .................... 60/757
4,719,748 A * 1/1988 Davis et al. ............... 60/39.37
5,129,231 A    7/1992 Becker et al. ............... 60/754
6,393,331 B1 * 5/2002 Chetta et al. ................ 700/97

OTHER PUBLICATIONS

"Design Automated Associaties" http://www.dassolution-.com/dto.asp p. 1-2 1998-2004.*

ICAD: "An Appropriate CACSD Package for Aerospace Applications" IEEE Aug. 22-27, 1999 p. 416-421.*

Chipperfield et al., "TI More Integrated Gas Turbine Engine Controller Design" IEE Sep. 1997 p. 357-363.*

* cited by examiner

FIG. 6

☐ Materials and Weight Report

Shell Material  ⟵ 312

Material  Selection List: [User Defined]  ⟵ 314
[XYZ]

Density of Selected Material:

Panel Material

Material  Selection List: [User Defined]
[XYZ] [DEF]                    ⟵ 318
        ⟋
Density of Selected Material:
316

Weight Report

[WEIGHT REPORT]

---

☐ Weight Report

[Updated] [Accept] [Cancel]

Shell Material:
OD Shell Density (lb/in^3):
OD Shell Volume =         in^3
OD Shell Height =         lbs ID Shell Density (lb/in^3):
ID Shell Volume =         in^3
ID Shell Height =         lbs Panel Material:
OD Panel Density (lb/in^3):
OD Panel Volume =         in^3
OD Panel Height =         lbs ID Panel Density (lb/in^3):
ID Panel Volume =         in^3
ID Panel Height =         lbs Total Weight =     lbs Spec Sheet

METHOD AND SYSTEM FOR DESIGNING AN IMPINGEMENT FILM FLOATWALL PANEL SYSTEM

BACKGROUND OF THE INVENTION

Some of the subject matter disclosed herein is related to the subject matter of commonly owned U.S. patents and patent applications: U.S. patent application Ser. No. 09/212,922, filed on Dec. 16, 1998, entitled "Method of Designing a Turbine Blade Outer Air Seal" and issued on May 21, 2002 as U.S. Pat. No. 6,393,331; U.S. patent application Ser. No. 09/520,085, filed on Mar. 7, 2000, entitled "Method and System for Designing a Spline Coupling" and issued on Jul. 1, 2003 as U.S. Pat. No. 6,587,741; U.S. patent application Ser. No. 09/511,549 filed on Feb. 23, 2000, entitled "Method and System for Designing a Low Pressure Turbine Shaft" and issued Sep. 23, 2003 as U.S. Pat. No. 6,625,507; and U.S. patent application Ser. No. 09/608,620 filed on June 30, 2000 entitled "Method and System for Designing Frames and Cases". All of the foregoing patent applications are hereby incorporated by reference.

FIELD OF THE INVENTION

This invention relates generally to computer-based methods and systems for designing products, and more particularly to a computer-based method and system for designing impingement film floatwall panels and shells for a combustion chamber of a gas turbine engine.

BACKGROUND OF THE INVENTION

An aircraft gas turbine engine generally comprises a compression section, a burner section and a turbine section. Each section operates on the working fluid in a well-known manner to generate thrust. The burner section, which contains a combustion chamber, burns a mixture of fuel and air, and delivers the resulting gases to the turbine at a temperature which will not exceed the allowable limit at the turbine inlet. The burners, within a very limited space, must add sufficient heat energy to the gases passing through the engine to accelerate their mass enough to produce the desired power for the turbine and thrust for the engine.

The combustion chamber includes continuous, circular, inner and outer shells inside which is burned the mixture of fuel and air. The shells support panels which line the inside or hotside of the combustion chamber. To extend the life of the panels, air which is not used for combustion is used to cool the panels. Holes in the shells and panels allow the cooling air to enter the combustion chamber, and impinge on the burning mixture of air and fuel, causing a film which protects the panels and shells. Examples of impingement film floatwall panels are given in U.S. Pat. Nos. 5,129,231, 4,653,279 and 4,622,821. All of these patents are assigned to the assignee of the present invention.

It is known to design various products using a computer-aided design ("CAD") system, a computer-aided manufacturing ("CAM") system, and/or a computer-aided engineering ("CAE") system. For sake of convenience, each of these similar types of systems is referred to hereinafter as a CAD system. A CAD system is a computer-based product design system implemented in software executing on a workstation. A CAD system allows the user to develop a product design or definition through development of a corresponding product model. The model is then typically used throughout the product development and manufacturing process. An example is the popular Unigraphics system commercially available from Unigraphics Solutions, Inc. (hereinafter "Unigraphics").

In addition to CAD systems, there is another type of computer-based product design system which is known as a "Knowledge-Based Engineering" ("KBE") system. A KBE system is a software tool that enables an organization to develop product model software, typically object-oriented, that can automate engineering definitions of products. The KBE system product model requires a set of engineering rules related to design and manufacturing, a thorough description of all relevant possible product configurations, and a product definition consisting of geometric and non-geometric parameters which unambiguously define a product. An example is the popular ICAD system commercially available from Knowledge Technologies, Inc. KBE systems are a complement to, rather than a replacement for, CAD systems.

An ICAD-developed program is object-oriented in the sense that the overall product model is decomposed into its constituent components or features whose parameters are individually defined. The ICAD-developed programs harness the knowledge base of an organization's resident experts in the form of design and manufacturing rules and best practices relating to the product to be designed. An ICAD product model software program facilitates rapid automated engineering product design, thereby allowing high quality products to get to market quicker.

The ICAD system allows the software engineer to develop product model software programs that create parametric, three-dimensional, geometric models of products to be manufactured. The software engineer utilizes a proprietary ICAD object-oriented programming language, which is based on the industry standard LISP language, to develop a product model software program that designs and manipulates desired geometric features of the product model. The product model software program enables the capturing of the engineering expertise of each product development discipline throughout the entire product design process. Included are not only the product geometry but also the product non-geometry, which includes product configuration, development processes, standard engineering methods and manufacturing rules. The resulting model configuration and parameter data, which typically satisfy the model design requirements, comprise the output of the product model software program. This output, from which the actual product may be manufactured, comprises a file containing data (e.g., dimensions) defining the various parameters and configuration features associated with each component or element of the product.

Also, the product model software program typically performs a "what if" analysis on the model by allowing the user to change model configuration and/or physical parameter values and then assess the resulting product design. Other analyses may be run to assess various model features with regard to such functional characteristics as performance, durability and manufacturability. The analytical results, e.g. temperature and stress, are functional parameters that are evaluated in terms of boundaries or limits. Limits on both physical and functional parameters have been developed over time based on knowledge accumulated through past design, manufacturing, performance, and durability experience. Essentially, these parameter limits comprise rules against which the proposed product model design is measured. Use of these historically developed parameters, analyses, and design procedures in this way is typically referred to as product "rule-based design" or "knowledge-based design". The rules determine whether the resulting product design will satisfy the component design requirements, such as weight, and whether the design is manufacturable, given various modern manufacturing processes. The rules for a particular product design are pre-programmed into the product model software program for that specific product.

While the ICAD system provides an excellent tool for developing software product models, it is not a replacement for an organization's primary CAD system, which maintains the product model definition throughout the entire product design and manufacturing cycle. This is because the ICAD system is a KBE software development tool rather than a CAD system. For example, while the ICAD system can create a geometric model, it cannot easily create drawings based on that model or support other aspects of the design process typically provided by CAD systems. As such, for the product model created in the ICAD system to be useful throughout the entire product development process, the model must be transported into a CAD system for further manipulation.

Another inherent problem with the commercial ICAD system is that the parametric model created by the product model software program cannot be transported as a similar parametric product model into a Unigraphics CAD system. Instead, the parametric model in ICAD must be transported into Unigraphics as a non-parametric model.

Since design and manufacturing technology is always evolving, the product model imported from the ICAD system into Unigraphics will usually be enhanced with new technology design or manufacturing features. Furthermore, since it is difficult to make modifications to a non-parametric model in Unigraphics, revisions to the product model must normally be made in the ICAD system and re-imported into Unigraphics. This causes any additional features previously added in Unigraphics to be lost.

On the other hand, the Unigraphics CAD system has inherent problems in that not all of the parametric models created by Unigraphics are "standardized" within an organization or industry. Also, parametric models implemented in Unigraphics do not effectively implement a KBE system (similar to the ICAD system) that requires the model configuration and order of Boolean operations to vary according to design requirements. Also, a Unigraphics parametric model cannot be structured to provide parameter relationships that satisfy both design and manufacturing requirements.

As a result, there are instances when a product model developed solely in either the ICAD system or the Unigraphics system will suffice, even with the aforementioned shortcomings. However, there are other instances when it is desired to transport a parametric product model developed in the ICAD system to the Unigraphics CAD system as a corresponding parametric product model.

An object of the present invention is to provide a computer-based method of creating a parametric, three-dimensional, geometric product model of the impingement film floatwall panels and supporting shells of a combustion chamber of a gas turbine engine.

Another object of the present invention is to provide a computer-based method of creating a parametric product model in a KBE system that can be recreated as a similar parametric product model in a CAD system.

The above and other objects and advantages of the present invention will become more readily apparent when the following description of a best mode embodiment of the present invention is read in conjunction with the accompanying drawings.

SUMMARY OF THE INVENTION

A method for designing an impingement film floatwall panel system for a combustion chamber for a gas turbine engine including the step of creating an impingement film floatwall panel knowledge base of information. The knowledge base has a plurality of design rule signals with respect to a corresponding plurality of parameter signals of associated elements of impingement film floatwall panels for a combustion chamber, wherein the knowledge base comprises at least one data value signal for each one of the plurality of design rule signals. The method includes the steps of entering a desired data value signal for a selected one of the plurality of parameter signals of an associated element of the impingement film floatwall panels and comparing the entered desired data value signal for the selected one of the plurality of parameters with the corresponding at least one data value signal in the knowledge base for the corresponding one of the plurality of design rule signals. The method also includes creating signals representative of a geometric representation of the selected one of the plurality of parameter signals of the associated element of the impingement film floatwall panels if the result of the step of comparing is such that the entered desired data value signal for the selected one of the plurality of parameter signals is determined to have a first predetermined relationship with respect to the corresponding at least one data value signal in the knowledge base for the selected one of the plurality of design rule signals.

A computerized system for designing an impingement film floatwall panel system for a combustion chamber of a gas turbine engine comprising an impingement film floatwall panel knowledge base for storing a plurality of impingement film floatwall panel design parameter signals corresponding to a plurality of design rule signals for creating a geometric representation of an impingement film floatwall panel. The system includes selection means for receiving a parameter value signal corresponding to at least one of the design parameter signals, and processing means for comparing the parameter value signal with the at least one of the design parameter signals stored in the knowledge base. The system also includes means for creating the geometric representation of the impingement film floatwall panel if the parameter value signal has a first predetermined relationship with the design parameter signal and at least one of the design rule signals.

BRIEF DESCRIPTION OF THE DRAWINGS

FIG. 4, which includes

FIG. 6 is an exemplary graphical user interface displayed to the user of the product model software program illustrating individual panel geometry including ribs, grommets, posts and pins; and FIG. 7 is an exemplary graphical user interface displayed to the user of the product model software program illustrating a weight analysis report;

DETAILED DESCRIPTION OF THE PREFERRED EMBODIMENT

Figure 1:
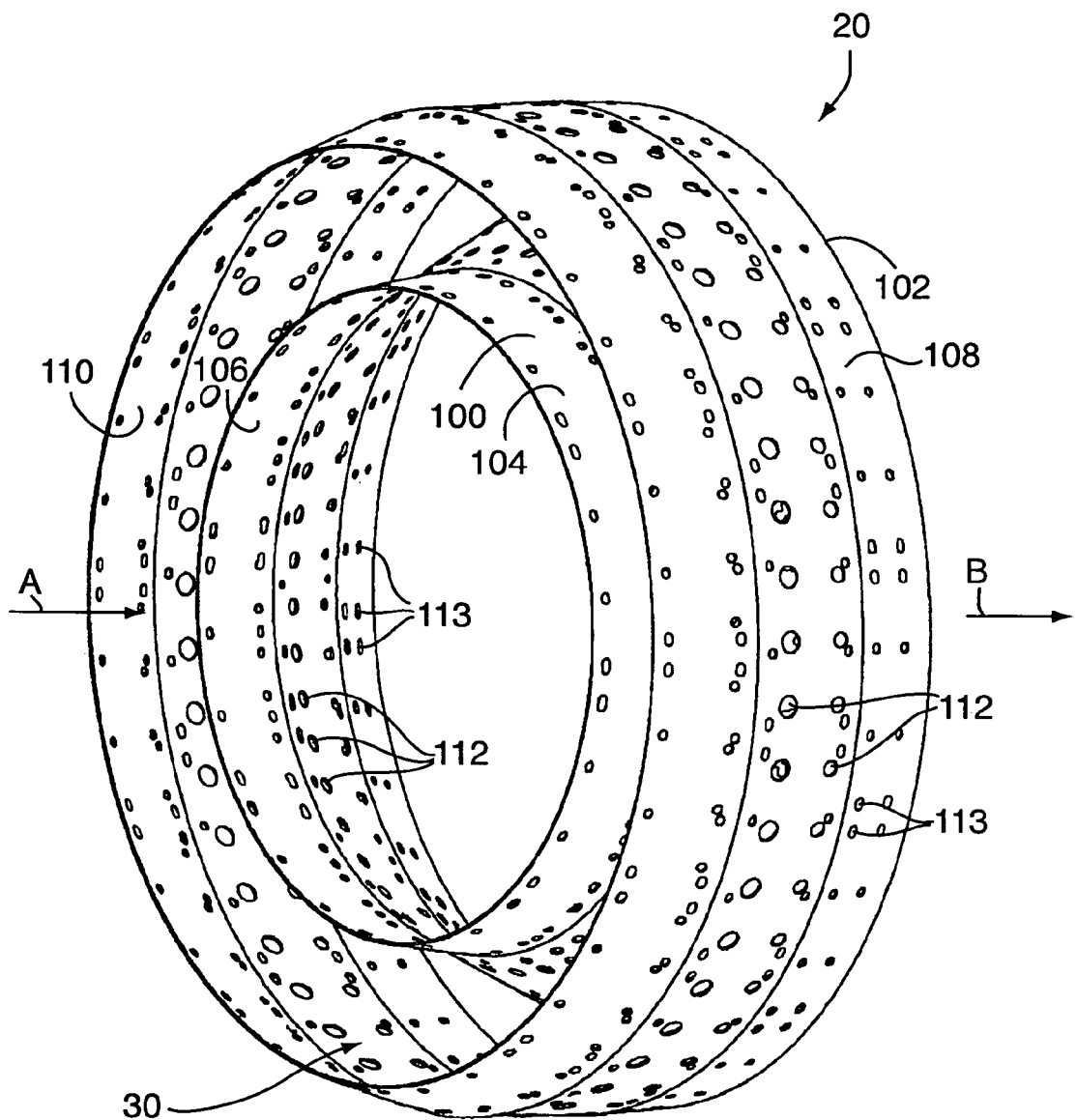
FIG. 1 is a perspective view of a geometric model of an inner diameter shell and an outer diameter shell of a combustion chamber, the model being created by the product model software program of FIG. 4, in accordance with the method and system of the present invention.

Referring to the figures in general, in an exemplary embodiment of the present invention, the invention generally comprises an algorithm embodied in a knowledge-based, product model software program 10 that creates a model 20 of impingement film floatwall panel system including impingement film floatwall panels and supporting shells for a combustion chamber 30 of a gas turbine engine. The resulting impingement film floatwall panels and supporting shells may then be manufactured from the model 20. The product model software program 10 may preferably be embodied in the aforementioned ICAD system, commercially available from Knowledge Technologies, Inc., and operating within a workstation, such as that available from Sun Microsystems or Silicon Graphics. The method and the apparatus of the present invention enables the rapid creation and manipulation of a parametric, three-dimensional, geometric model 20, or geometric representation 20, of the floatwall panels and supporting shells of the combustion chamber 30.

The design of a model 20 of the floatwall panels and shells includes entering into the product model software program 10 specifications for an aerodynamic engine flowpath which ideally defines the hotside combustion chamber contour and combustion hole sizes and locations. The product model software program 10 then uses its internal impingement film floatwall panel knowledge base of configuration dependent parameter relationships and constraints to create a valid three-dimensional impingement film floatwall panel model 20 of the panels and shells. This impingement film floatwall panel model 20 is the default model which defines default configuration parameters for the product model software program 10. The configuration parameters include, for example, a quantity, a position, and dimensions of all panels, stiffening ribs, grommets, posts and pins.

By operating the product model software program 10, the user enters or modifies configuration and parameter specifications regarding various structural features of the floatwall panels model 20. These specifications are typically entered using a keyboard or mouse associated with the workstation. The user is guided by graphical user interfaces ("GUIs") which display information from the floatwall panels knowledge base and design specifications entered by the user on a visual display screen associated with the workstation. The algorithm of the present invention embodied in the product model software program 10 compares the user entered design specifications against the impingement film floatwall panel knowledge base of information which is stored as part of the product model software program. The result of the comparison determines whether any design constraints, such as a limit on a number of panels, have been violated which would cause the floatwall panels and supporting shells to not satisfy the design requirements or be non-producible using modem manufacturing techniques. If so, specifications which define the floatwall panels model 20 should be modified.

The information stored in the impingement film floatwall panel knowledge base comprises engineering rules related to design and manufacturing of the floatwall panels and shells, a thorough description of all relevant possible floatwall panel and shell configurations, and a definition consisting of configuration and performance specifications which unambiguously define the floatwall panels and shells. Performance specifications include the development processes, standard engineering methods and manufacturing rules.

Requirements and limits for both configuration and performance specifications for floatwall panels and shells have been developed over time based on knowledge accumulated through past design, manufacturing, performance, and durability experience. Essentially, these specification limits comprise rules against which the floatwall panel model 20 is measured. The rules determine whether the resulting floatwall panel model 20 will satisfy the design requirements, such as weight, and whether the design is manufacturable, given various modern manufacturing processes. A large number of possible configuration and performance specification values and the complexity of the specification relationships are embodied in the floatwall panels knowledge base. The geometric representation of the floatwall panels model 20 may be manipulated by changing various configuration or performance specifications associated with the panels and shells. A modification to one configuration or performance specification of the floatwall panels model 20 may change the configuration of the floatwall panel model so as to cause another already entered configuration or performance specification to violate a limit stored in the floatwall panel knowledge base.

One of the advantages of the product model software program 10 is that it aids a designer who is familiar with floatwall panel and shell design constraints but who may not be familiar with manufacturing constraints or preferences of a particular company, such as a preference for the use of particular materials. The designer would have to spend a substantial amount of time looking up and learning a company's manufacturing constraints and preferences, or risk creating a floatwall panels and shell design which could not be cost-efficiently manufactured. The product model software program 10 eliminates this time consuming and expensive problem by including the manufacturing constraints and company preferences as part of the impingement film floatwall panel knowledge base.

The product model software program 10 may also perform a weight report analysis on the floatwall panels and shells model 20. The configuration specifications of the floatwall panels model 20 can be modified, if the results of the weight analysis do not satisfy design criteria. Once creation of a floatwall panel model 20 which satisfies all configuration and specification rules in the floatwall panel knowledge base is complete, the product model software program 10 outputs a file containing floatwall panel model configuration and parameter data. Other computer programs may then use this output file in a desired manner, such as for recreating the model in a CAD system. The product model software program 10 also creates output files for creating a non-parametric geometric model in a CAD system.

FIG. 1 illustrates an exemplary embodiment of a model 20 of an inner diameter (ID) shell 100 and an outer diameter (OD) shell 102 of a combustion chamber 30 of a gas turbine engine (not shown). The ID shell 100 and OD shell 102 may be designed using the method of the present invention.

Continuing with FIG. 1, the floatwall panel knowledge base contains information in the form of specifications, such as temperatures and pressures, which describe the environment in which the floatwall panels and shells model must successfully function. The environment includes a fuel and air mixture which is burned in the combustion chamber 30 and flows between the ID shell 100 and the OD shell 102. The surface of the ID shell 100 adjacent to the burning mixture is the hotside 104 of the ID shell. The surface of the ID shell 100 which is not adjacent to the burning mixture is the coldside 106 of the ID shell.

Still referring to FIG. 1, the surface of the OD shell 102 adjacent to the burning mixture is the hotside 108 of the OD shell. The surface of the OD shell 102 which is not adjacent to the burning mixture is the coldside 110 of the OD shell. The fuel and air mixture input side of the combustion chamber 30 is designated by A, and the output side of the combustion chamber is designated by B, with the arrows indicating the general direction of airflow. Combustion and dilution holes 112 which are defined by the ID shell 100 and the OD shell 102 are used for adding additional air for combustion and control of the temperature profile entering the turbine. Slots 113 are used for attaching panels 114 to the shells 100, 102.

Figure 2:
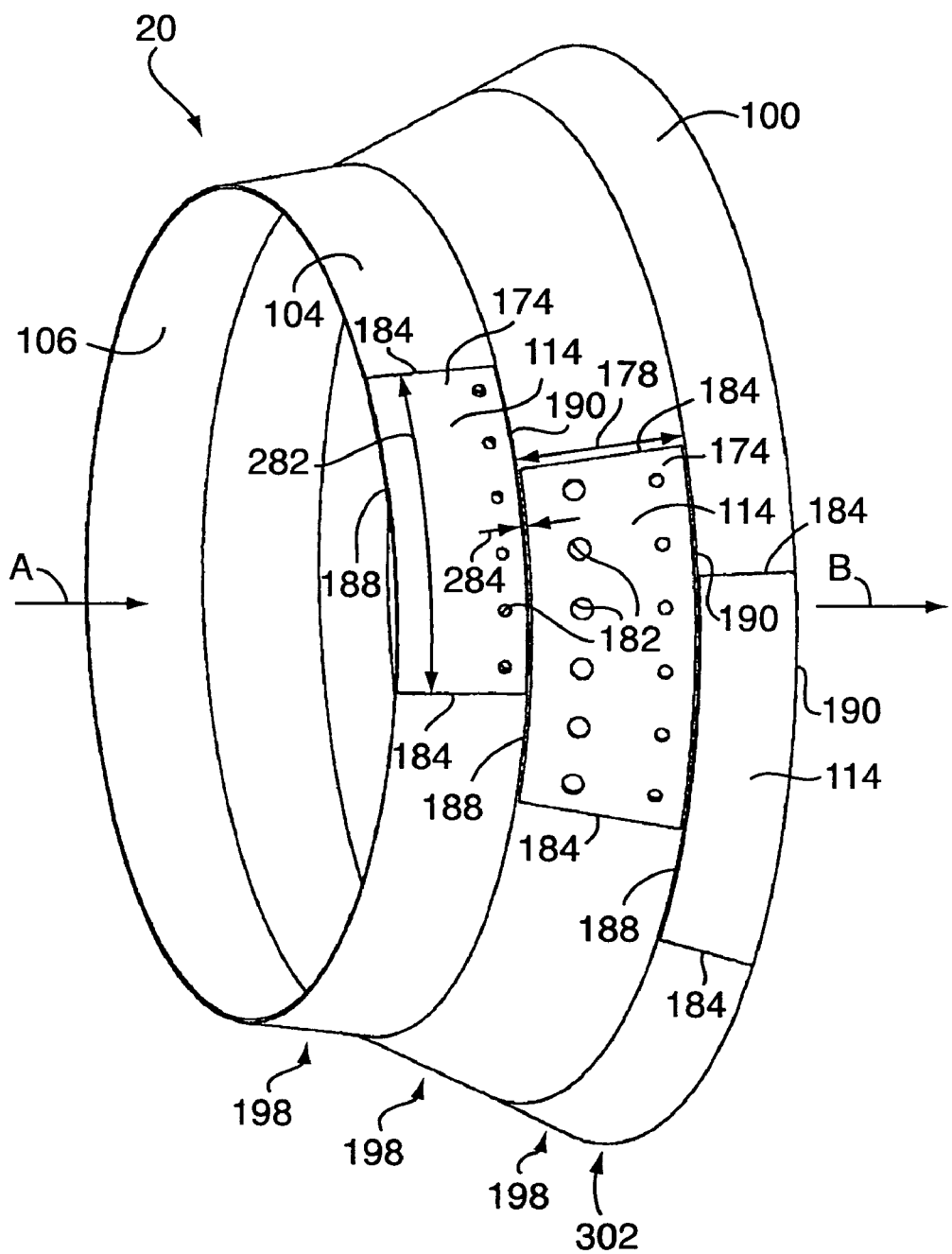
FIG. 2 is a perspective view of a geometric model of an inner diameter shell with attached impingement film floatwall panels, the model being created by the product model software program of FIG. 4, in accordance with the method and system of the present invention.

FIG. 2 illustrates a simplified model of impingement film floatwall panels 114 bolted to the hotside 104 of the ID shell 100. Similar panels 114 are also bolted to the hotside 108 of the OD shell 102. The panels 114 may be designed using the method of the present invention.

Figure 3:
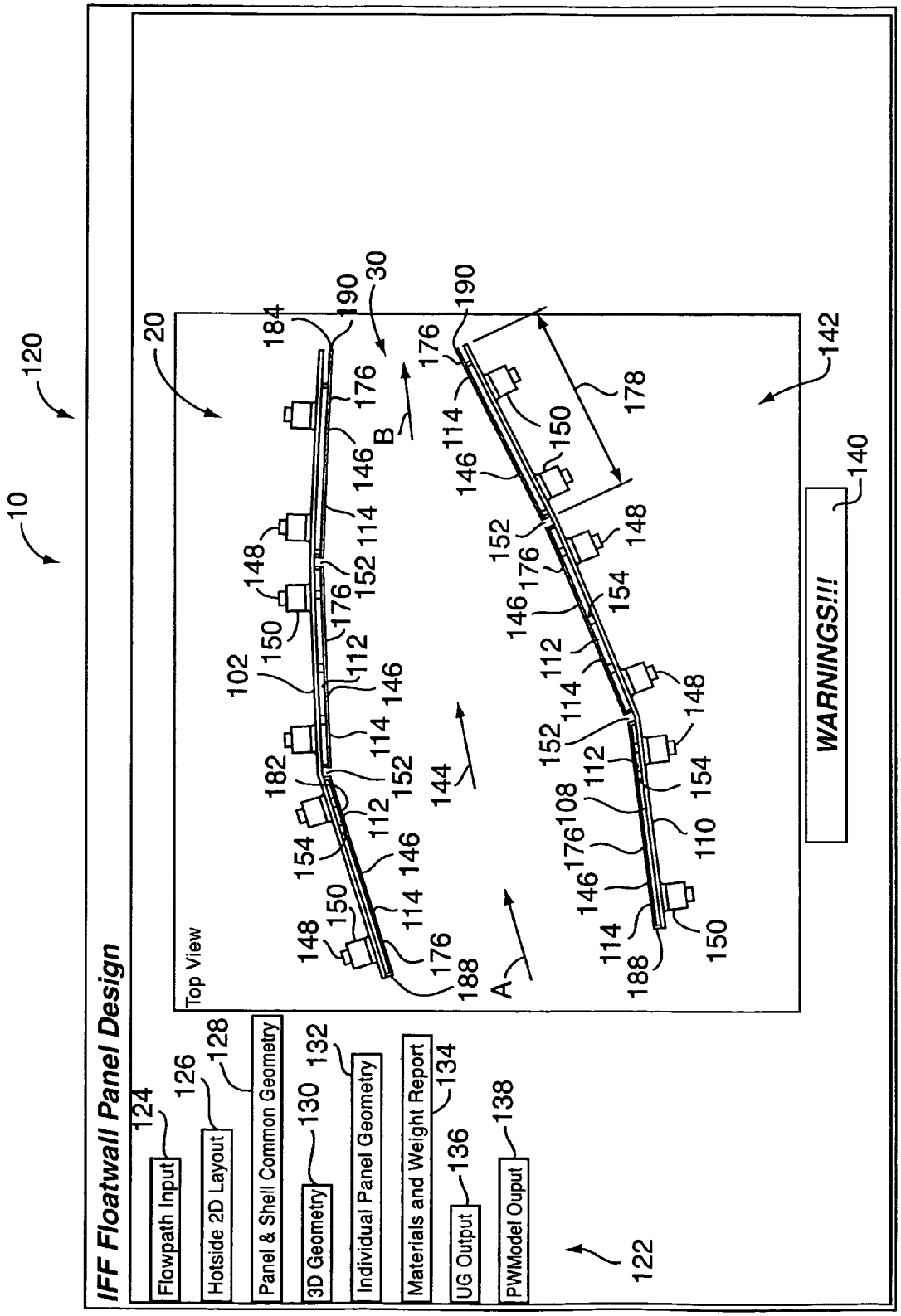
FIG. 3 is an illustration of an exemplary graphical user interface displayed to the user of the product model software program showing a cross section of the panels and shells model and facilitating entry by the user into the program of desired selections for the various physical features of the models of FIGS. 1 and 2.

Referring to FIG. 3, each panel 114 contains a number of distinct physical structural features that may be designed into the corresponding panels and shells model by the product model software program 10, in accordance with an exemplary embodiment of the present invention. Many types of known structural features of the impingement film floatwall panels and shells are contemplated by the method and system of the present invention, as described hereinafter.

As shown in FIG. 3 in a GUI screen 120 displayed to the user by the algorithm of the present invention embodied in the product model software program 10, the buttons 122 labeled Flowpath Input 124, Hotside 2D Layout 126, Panel and Shell Common Geometry 128, 3D Geometry 130, Individual Panel Geometry 132, Material and Weight Report 134, UG Output 136, and PWModel Output 138, indicate the usual logical steps in the design process for developing the panels and shells model. The user, by selecting each button 122, invokes at least one additional GUI screen for adding or modifying floatwall panel model 20 parameters, such as the length of a panel 114. While a logical order to the design process for the impingement film floatwall panels and shells model 20 has been shown, the present invention is not limited in this regard, as parameters may be modified and input in numerous different orders.

Still referring to FIG. 3, a Warnings button 140 may be displayed on any GUI screen to notify the user that a rule has been violated. In accordance with the algorithm of the present invention, the product model software program 10 continually evaluates the validity of the floatwall panels model 20. The evaluation compares specification values with performance and specification limits previously entered or calculated in accordance with floatwall panel knowledge base which is stored on the workstation. If a comparison indicates that a specification value oversteps a performance or specification limit, a cautionary warning is displayed to the user. Due to the large number of possible specification values and the complexity of the specification relationships embodied in the floatwall panel knowledge base, a modification to one specification of the floatwall panel model 20 may cause a warning to be displayed in regard to a violation of a rule for another specification.

The user may click on the Warnings button 140 using a keyboard 168 or a mouse 170 to display information relating to the rule or rules which have been violated. The user decides whether the violation of the rule and the overstepping of specification limits invalidates the design of the floatwall panel model 20. The user may ignore the displayed warning information and leave the Warnings button 140 and the specification affected by the warning highlighted and displayed, or the user may clear the warning information so that the highlighted warning does not appear. The user may also modify the specification or specifications which have caused the rule violation and the display of the warning.

Figure 3A:
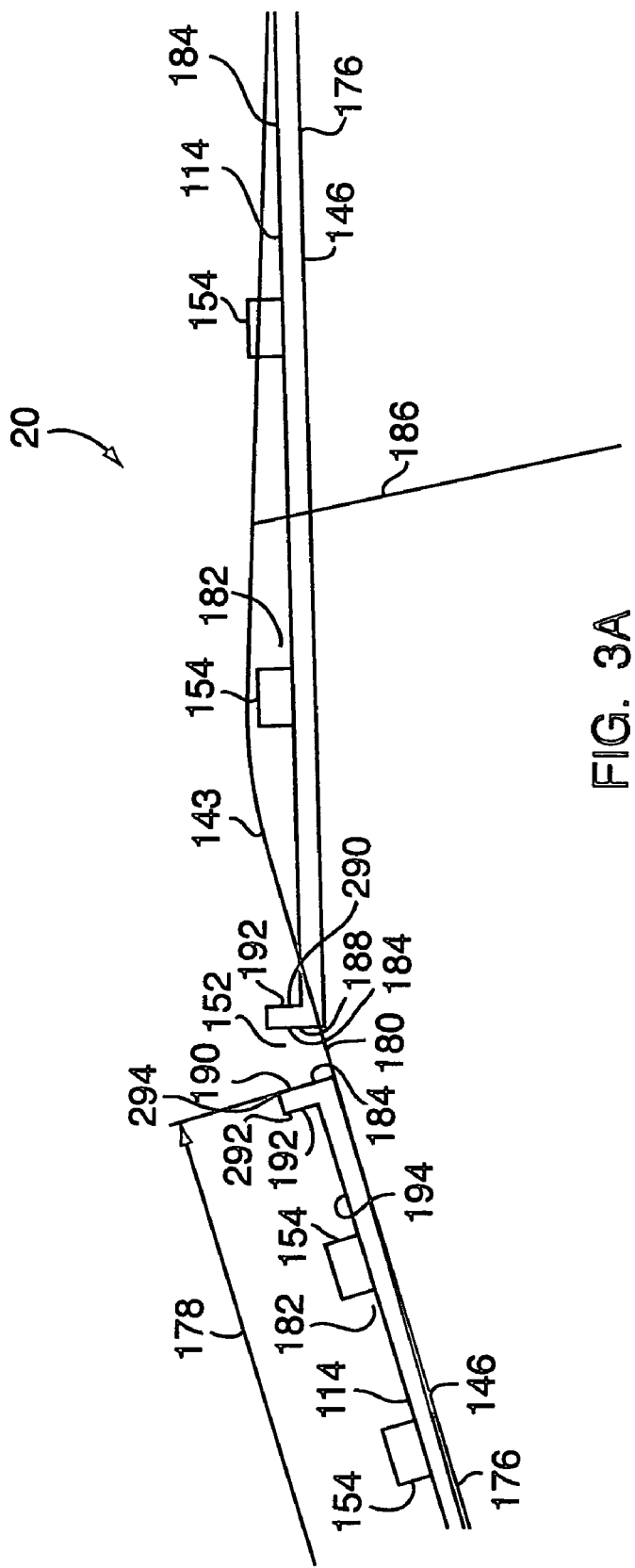
FIG. 3A is a partial expanded view of the panels geometric model with flowpath, the geometric model being created by the product model software program of FIG. 4.
Figure 4A:
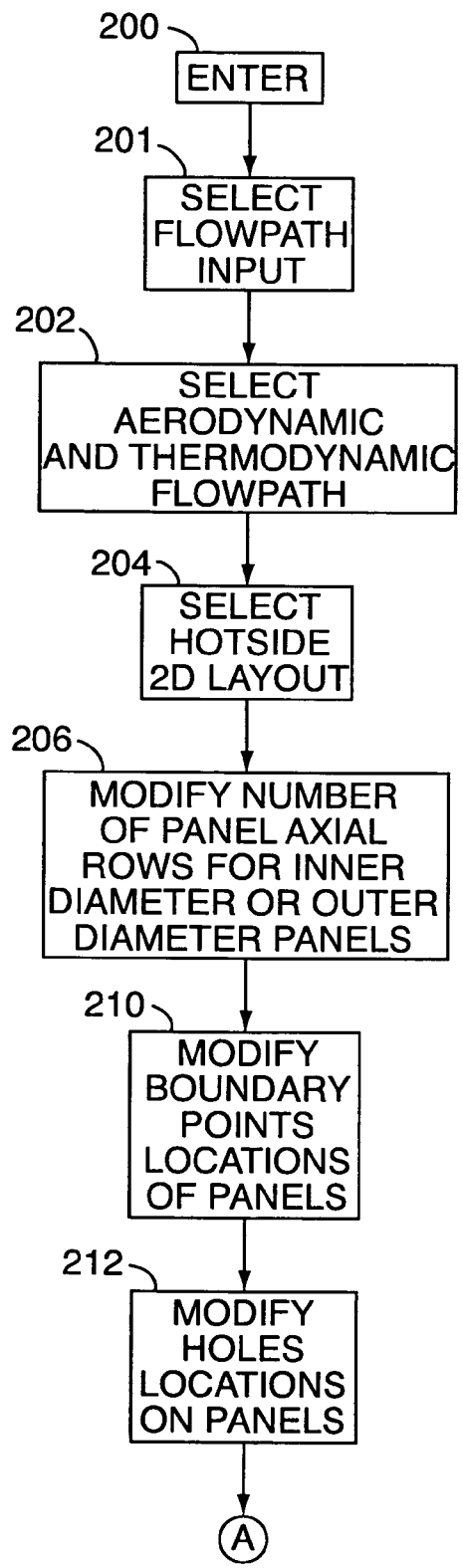
FIGS. 4A to 4F, illustrates a flow chart showing an embodiment of steps performed by the product model software program in creating the geometric models of FIGS. 1, 2, 3, and 3A in accordance with the method and system of the present invention.
Figure 4B:
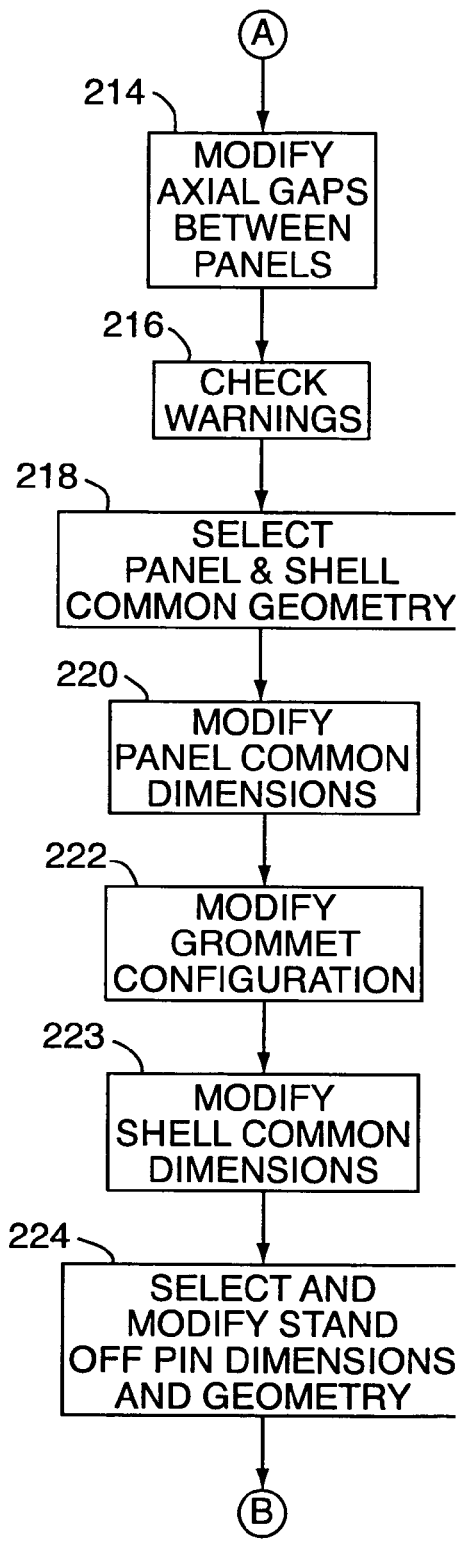
Figure 4C:
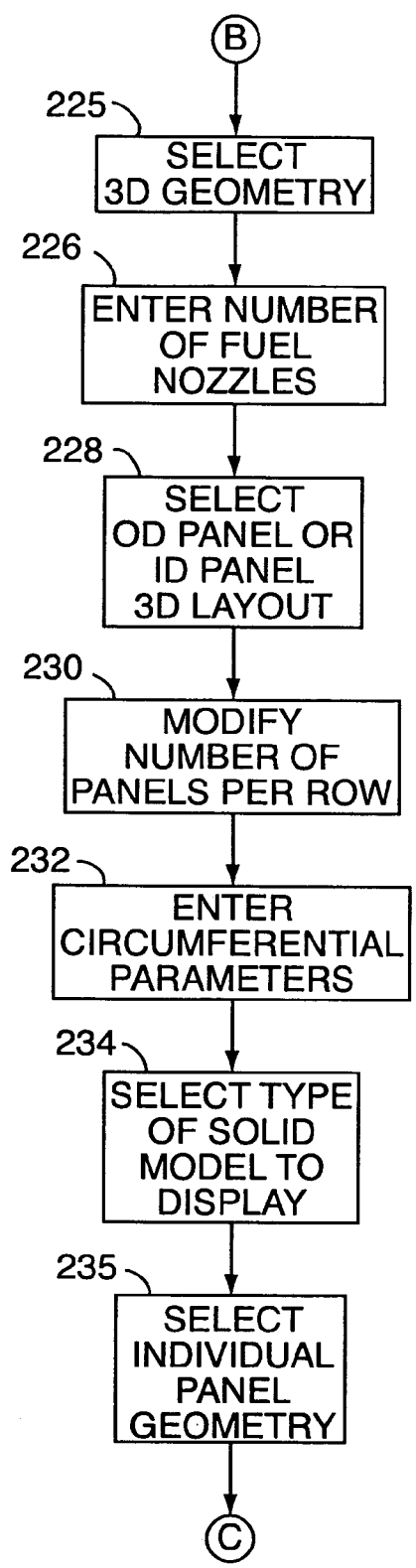
Figure 4D:
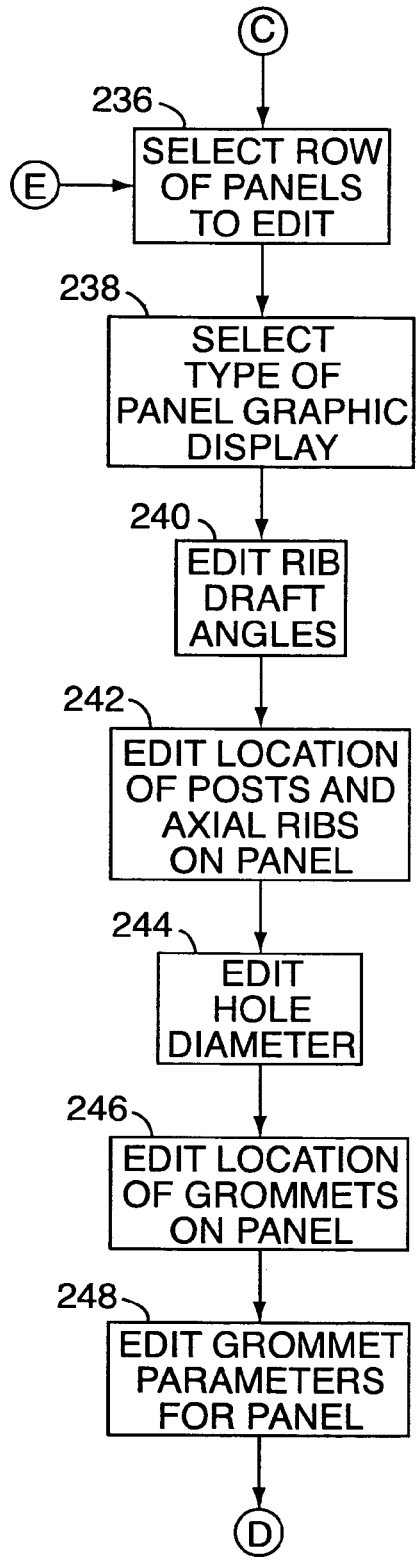
Figures 4E, 4F:
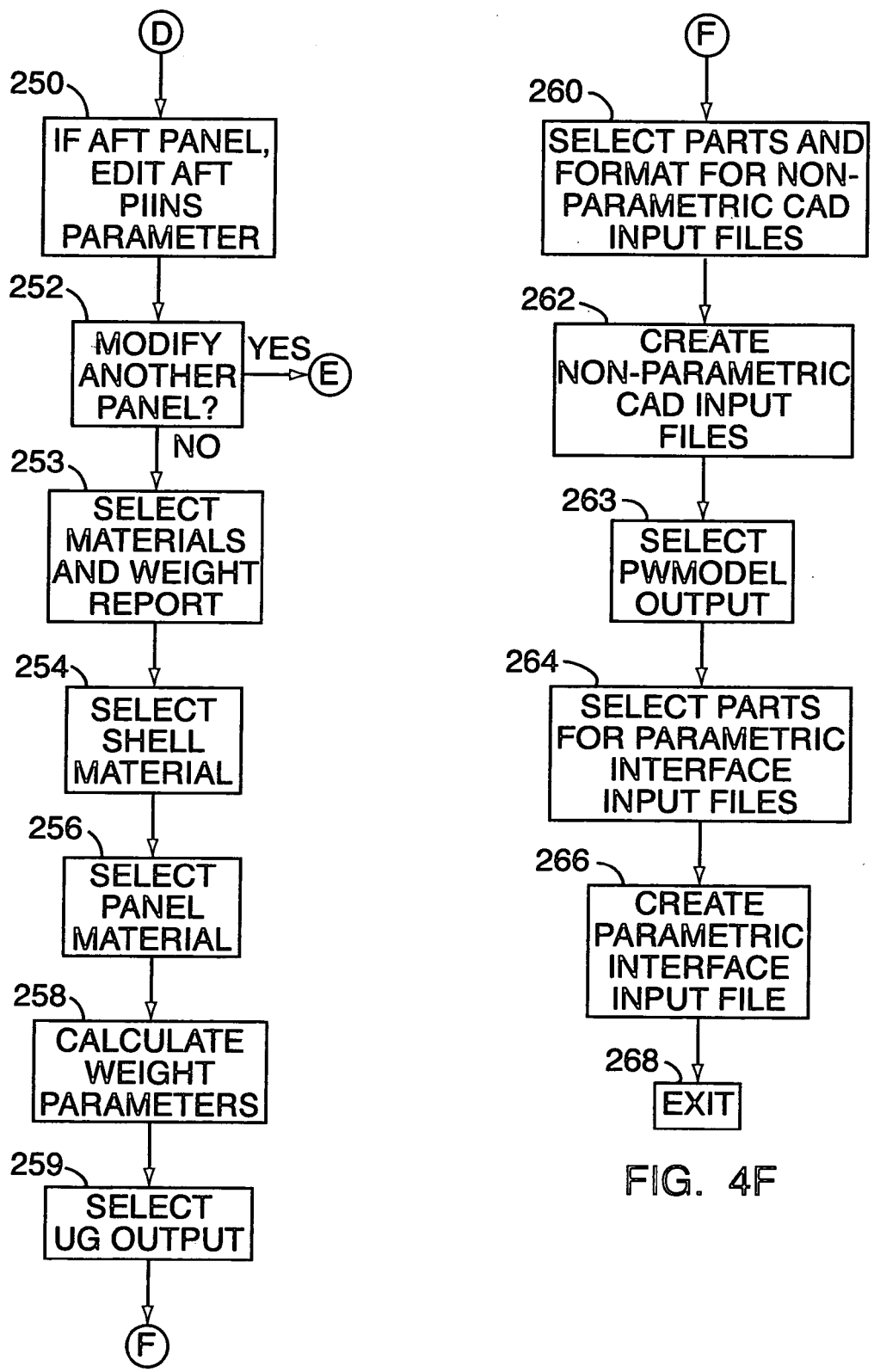

Continuing with FIGS. 3 and 3A, a two-dimensional drawing 142 shows a cross section of the model 20 of the panels 114 and OD shell 102. The product model software program 10 attempts to fit the hotside 146 of the panels 114 to a contour 143 of a selected aerodynamic thermal flowpath 144. The drawing 142 also displays features associated with the panels and shells, such as threaded posts 148, nuts 150, axial gaps 152 and grommets 154.

Figure 5:
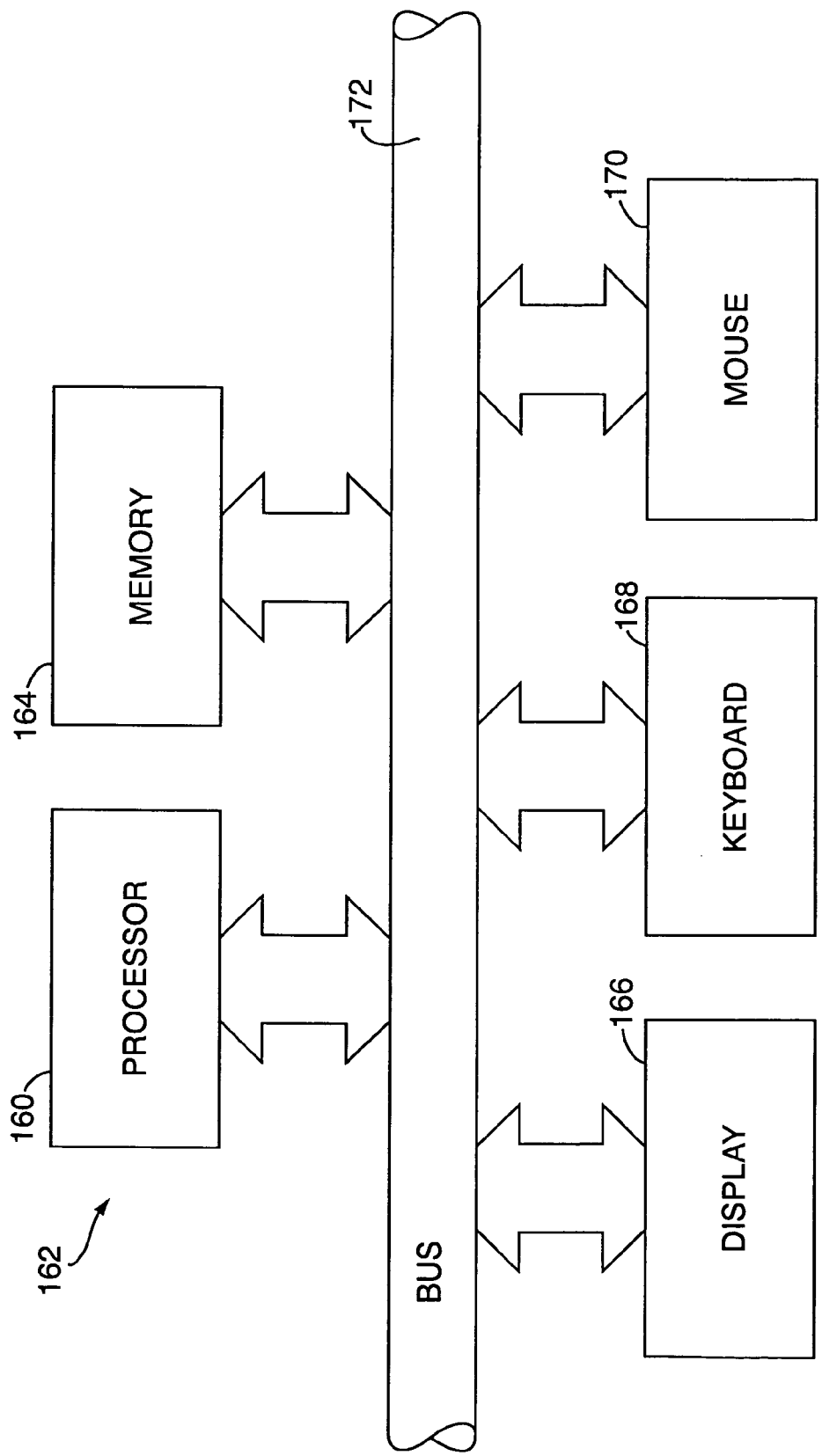
FIG. 5 is a block diagram of a workstation within which the product model software program of FIG. 4 is implemented.

FIG. 4 is a flow chart of steps performed by an exemplary embodiment of the product model software program 10 in creating the panels and shells model 20. The program code is preferably written in the proprietary ICAD object-oriented programming language, which is based on the industry standard LISP language. The program code executes on a computer processor 160 within a workstation 162, such as that illustrated in FIG. 5. The workstation 162 may also contain a memory 164 for storing program code and calculated data, a visual display screen 166 for displaying various information to the user along with the panels and shells model 20 after it has been created, and the keyboard 168 and the mouse 170 that are both used to input information to the processor 160 and memory 164. These various devices are connected together by a bus 172.

The product model software program 10 consists of signals stored on a computer system, such as the workstation 162, which are processed by the processor 160 of the workstation. The floatwall panels knowledge base included within the product model software program 10 are also signals stored on the computer system, as are the specifications and parameters stored within the knowledge base, and the geometric representations and the floatwall panel model 20 created by the product model software program. Parameters are a variable or an arbitrary constant appearing in a mathematical expression or a computer program, each value of which restricts or determines the specific form of the expression. A parameter is broader and more general, than a specification. A specification is a entry or variable prescribing materials, dimensions, and workmanship for something to be built, installed, or manufactured. Specifications are a subset of parameters. A rule is a relationship between parameters, including specifications, such as a limit that a panel may not be more than 4 inches in length. Parameter values may be predefined in the floatwall panel knowledge base or entered by a user.

Continuing with FIG. 4, after an enter step 200 in the flow chart, in a step 201, the user selects the Flowpath Input button 124, and, in a step 202, the product model software program inputs the data from a flowpath file and creates and displays a geometric representation of a default aerodynamic engine flowpath 144. The user may accept and continue the operation of the product model software program 10 with the default flowpath 144 or the flowpath may be changed by selecting a new flowpath file from a list of flowpath files which is displayed on the GUI screen. A common method for selecting filenames (and for other types of parameter inputs, described hereinafter), is selecting from default values offered to the user on the GUI screen. The default values are part of the impingement film floatwall panel knowledge base of parameters or specifications related to the floatwall panels and shells model whose values are pre-programmed into the product model software program. Besides default values for parameters or specifications, the impingement film floatwall panel knowledge base may also contain constraints on parameter inputs. These constraints and default values may comprise either a single value or range of values. For example, a parameter value may be greater than or less than a certain value. Also, the constraints and defaults may be derived from mathematical equations. A constraint or default value can either be dependent or independent of other parameters.

Referring to FIGS. 3 and 4, after the user selects the flowpath 144 in the step 202, the model program generates and displays a two-dimensional geometric representation of the default panels and shells model 20. Selecting the Hotside 2D Layout button 126 displays a GUI screen showing specifications for changing the number and geometry of outer diameter (OD) panels 176 associated with outer diameter (OD) shell 102, as shown in a step 204. A similar GUI screen may be used to show specifications for changing the number and geometry of inner diameter (ID) panels 174 associated with inner diameter (ID) shell 100 as shown in FIG. 2. Ideally, the panels 114 would conform exactly to the contour 143 of the flowpath 144. However, a design goal, or rule, in the floatwall panels knowledge base, is to minimize the number of panels 114 to reduce manufacturing and installation costs. Another rule, also to reduce manufacturing costs, is that each panel's axial length 178 may not exceed four inches. In step 206 of FIG. 4, the user may modify the specification of the number of panels 114 lining the axial length of the flowpath contour 143.

Referring to FIGS. 3A and 4, in step 210, the axial length specification 178 of the panels 114 may be modified, according to the above-mentioned rules, by moving a boundary point specification 180 between the panels. The boundary point specification 180 is a location between panels 114 which is constrained to follow the flowpath contour 143. A user may manipulate the boundary point 180 by changing on the GUI screen the specification value of the boundary point's spline length location, or by employing the mouse 170 to drag the representation of the boundary point on the geometric representation of the floatwall panels model 20. The spline length location is a position along a curve, such as a flowpath contour 143. When the user manipulates and moves the boundary point 180, the product model software program 10 reduces the axial length specification 178 of the panel 114 in the floatwall panel model 20 towards which the boundary point moves. The product model software program 10 also increases the axial length specification of the panel 114 in the floatwall panel model 20 which the boundary point moves away.

Continuing with FIG. 4, the user selects a number of configuration specification values with respect to various location or physical characteristics, such as material selections, within the panels and shells model 20. Throughout program execution, various GUI screens, such as the GUI screen 120 of FIG. 3, guide the user while entering specifications and information. These GUI screens 120 display various model configuration specifications and parameter value selections to the user, allowing the user to select a desired default specification value, or to enter a desired specification value.

As with boundary point specifications, many of the specifications of the panels and shells model 20 may be modified both by manipulating the panel 114 representations with the mouse 170, and by changing the values of the specifications with the keyboard 168. The present invention contemplates that one of ordinary skill in the art will include someone with skill in designing impingement film floatwall panels 114 and shells 100, 102 for combustion chambers 30 for gas turbine engines. Thus, the various characteristics or specifications of the floatwall panels 114 and shells 100, 102, together with the values for these specifications, should be readily apparent to someone with such skill. Nevertheless, where appropriate, a discussion of various floatwall panel 114 specifications or characteristics, together with the manner of deriving certain default or derived values for these specifications, is provided herein.

Still referring to FIG. 4, the user next enters, in a step 212, a value for location of panel holes 182. The panel combustion and dilution holes 182 correspond to the combustion and dilution holes 112 in the shells 100, 102. The panel combustion and dilution holes 182 allow additional air to enter the combustion chamber 30. The aerodynamic engine flowpath designer creates the flowpath file which is input to the product model software program in the step 202. The aerodynamic engine flowpath designer includes in the flowpath file specifications representing default locations of shell combustion and dilution holes 112 and corresponding panel combustion and dilution holes 182 to provide the necessary combustion process. The default locations of the combustion and dilution holes 112, 182 are calculated and placed along the flowpath contour, without taking into account the rules in the floatwall panels knowledge base relating to panel 114 and shell 100, 102 design.

During the creation of the default panels and shells model 20 by the product model software program 10 from the aerodynamic engine flowpath file, a specification for a panel hole 182 may have located the panel hole either between the location of panels 114 or too close to the circumferential edge 184 of a panel. The panel holes 182 should be moved by changing the specifications of the panel holes location to correspond to the program's 10 rules.

Referring to FIG. 3A, panels 114 do not curve in the axial direction (A to B), therefore they do not always correspond to the flowpath contour 143. When a panel 114 deviates from the flowpath contour 143, the dilution hole 182 on that panel is translated from the flowpath contour to the panel along a line 186 perpendicular to the center line of the combustion chamber 30.

It should be understood that these panel specifications, and their order of entry into the program, are purely exemplary. Instead, as should be readily apparent to one of ordinary skill in the art, other panel characteristics and specifications may be input in various orders by the user. For example, these other specifications in the product model software program 10 include the axial gaps 152 between the leading edge 188 and trailing edge 190 of the panels 114 and the panel rib 192 locations. Also included may be the draft angle of the rib 192 on the leading edge 188 and trailing edge 190 of the panel 114, and locations and dimensions of grommets 154.

As shown in FIGS. 3A and 4, in a step 214, the parameters for axial gaps 152 between panels 114 may be modified. The axial gaps 152 provide room for expansion of the panels 114 due to the high temperatures which occur within the combustion chamber 30. In addition, the panels 114 shield the shells 100, 102 and reduce the temperature to which the shells are exposed to a level which the shells can structurally withstand. The axial gaps 152 must allow room for thermal expansion of the panels 114, but still protect the shells 100, 102 to which the panels 114 are attached.

Referring to FIG. 4, the user in a step 216 clicks on the Warnings button 140, and displays detailed information regarding any violations of the rules which have occurred. The Warnings button 140 appears only when a violation of a rule has occurred, and therefore the button's presence provides notice of a rule violation to the user. As noted earlier, the warnings may be checked at any time, and any violations may be corrected at any time in any order desired by the user.

Continuing with FIG. 4, in step 218, by selecting the Panel and Shell Common Geometry button 128, parameters which are common to all panels 114 may be modified including, in a step 220, the height and thickness of the panels 114, as well as width of ribs 192, and in a step 222, the width of grommets 154. The values of some parameters are fixed and may not be changed, such as the panel posts 148, which have a fixed diameter. The posts 148 are positioned on the coldside 194 of the panels 114 and protrude through slots 113 in the shells 100, 102. Nuts 150 fasten on the posts 148 to secure the panels 114 to the shells 100, 102.

Still referring to FIG. 4, some parameters have minimum or maximum values, such as the post 148 length, which may be lengthened from the default value, but not shortened. Other parameter values may only be selected from a list of values, and not entered. For instance, in a step 223, the user may select the OD shell 102 thickness and ID shell 100 thickness, which are limited to only certain values. These limitations on parameter values can be due to manufacturing, material and cost restrictions, as well as functional design restrictions. For example, grommets 154 may be designed parallel to the pull plane to be removed from molds during manufacturing.

Figure 6:
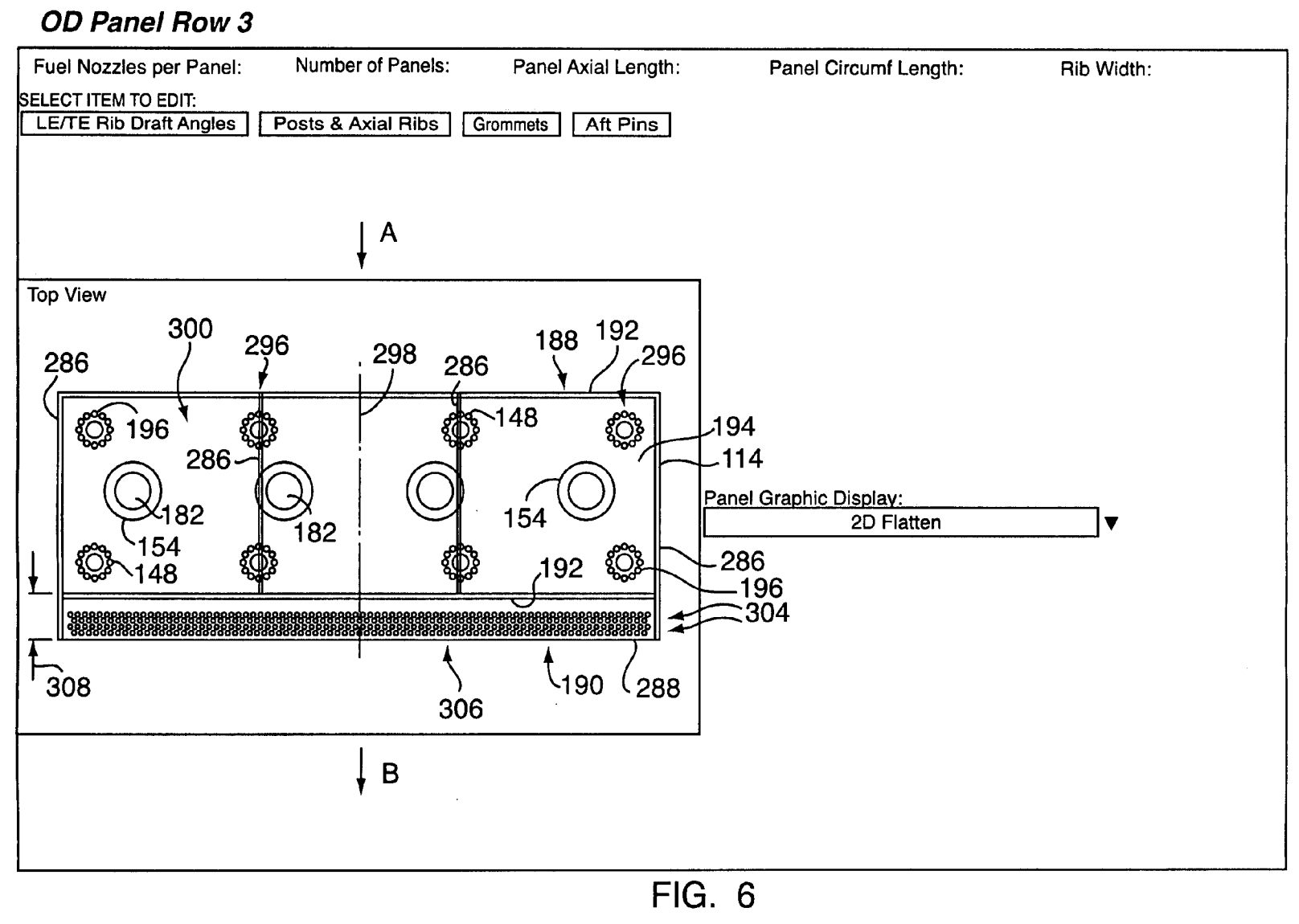

Still referring to FIG. 4 and also FIG. 6, the user enters and modifies in step 224 configuration specifications of the product model software program for creating the floatwall panel model 20 relating to standoff pins 196, such as pin diameter, the radial gap between the pins and the post 148, gap between standoff pins, number of standoff pins, pin shape, and the axis of the standoff pin. Standoff pins 196 surround the panel posts 148 and provide support and prevent warping of the shell 100, 102 and attached panel 114 as the nut 150 placed on the post is tightened.

Referring to FIG. 3, in a step 225, the 3D Geometry button 130 is selected by the user from the GUI screen 120. By default, a three-dimensional geometric representation of the floatwall panel model 20 is not immediately displayed due to the time required to calculate and display the three-dimensional geometric representation. Instead, the user enters a number of parameters and selects the type of three-dimensional geometric representation to display.

Referring to FIG. 4, in a step 226, the number of fuel nozzles (not shown) in the combustion chamber 30 are entered. The number of fuel nozzles determines the default number of panels 114 per circumferential row 198 and sets the remaining parameters for the three-dimensional model of the panels.

Continuing with FIG. 4, in a step 228, the user selects either OD panel layout specifications or ID panel three-dimensional layout specifications on a GUI screen. These specifications affect the positioning of the panels 114 attached to the ID shell 100 or OD shell 102 in the floatwall panel model 20. The user can then change, in a step 230, the number of panels 114 per circumferential row 198 attached to the selected ID shell 100 or OD shell 102. Rules stored in the floatwall panel knowledge base require that all rows 198 have the same number of panels 114, which must be a multiple of the number of fuel nozzles in the combustion chamber 30. For instance, if the number of fuel nozzles is 24, the number of panels 114 per circumferential row 198 is limited to 24, 12, 8, 6 or 4.

Referring to FIGS. 2 and 4, in a step 232, the user enters the circumferential configuration specifications for positioning the panels 114, such as the panel clocking specification value. Panel clocking refers to the relative positioning of the panels 114 of one row 198 to the panels in another row. A rule in the floatwall panel knowledge base requires that in order to provide thermal protection for the shells 100, 102, the gaps between panels 114 in one row 198 should not align with the gaps between panels in another row.

Continuing to refer to FIGS. 2 and 4 and the step 232, for instance, if there are three rows 198 of panels 114, the circumferential edges 184 of the panels in the second row may be staggered approximately ⅓ of the circumferential length 282 of the panel from the panels in the first row. The panels 114 in the third row may be staggered approximately ⅓ of the circumferential length 282 of the panels in the second row, and ⅔ of the circumferential length of the panels in the first row. The product model software program defines row one as the row of panels closest to the front A of the combustion chamber 30, while the last row, or row three in this example, is the row of panels closest to the aft end B of the combustion chamber.

Still referring to the step 232, the panel circumferential gap specification 284 between the edges of adjacent circumferential rows 198 of panels may be modified by the user. Panel mid span arc lengths are computed for each panel 114 in the row 198 by the product model software program 10, and a floatwall panel knowledge base rule is violated and a warning is displayed on a GUI screen if the arc lengths exceed ten inches. Note that modifying the number of panels 114 per row 198 alters the circumferential arc length of the panels.

Continuing to refer to FIG. 4, in a step 234, the user selects the type of components of the floatwall panel model 20 to display. Selections include "OD panel—one panel per row with shell", and "ID panel—all panels per row with shell". Once a component or components have been chosen, a three-dimensional geometric representation of the selected components of the floatwall panel model 20 can be displayed.

The ICAD system creates a valid, parametric, three-dimensional, geometric model 20 of the panels and shells using the user-input data verified against the impingement film floatwall panel knowledge base of configuration-dependent parameter relationships and constraints stored in the product model software program of the present invention. The ICAD system inherently contains a number of common geometric primitives (e.g., a cylinder) that the product model software program utilizes in creating the model. These primitives are inherent in the sense that they reside in the ICAD system apart from the product model software programs. As such, the primitives do not have to be pre-programmed into the product model software program. However, the product model software program 10 contains the rules that relate a primitive or combination of primitives to a geometrical feature of the floatwall panel model 20.

Referring to FIG. 3, in a step 235, the user selects Individual Panel Geometry button 132 from the GUI screen 120. A series of GUI screens 120 permits modifications to specifications of the panels 114 of the floatwall panel model 20 located in a circumferential row 198 of panels, such as the panels attached as row 1 to the OD shell 100 or the panels attached as row 3 to the ID shell 102. The term "individual panel" means all panels 114 which make up a row 198 of panels, since all panels in a row are identical. Individual panel specifications apply equally to all panels 114 in a row 198, and include the ribs 192, the posts 148, and the grommets 154.

Similar to the other major structural features of the panels and shells model 20, the product model software program 10 of the present invention stores (as part of its internal knowledge base for the panels and shells model) a number of default values for various configuration and characteristic specifications of the panels 114. These characteristics include various depths, thickness, widths, lengths, radii, and orientations.

As shown in FIG. 4, in a step 236, the user selects a row of panels 114 to edit. A two-dimensional cross section view of the rows 198 of panels 114 is displayed on the GUI screen 120 which shows the default locations of the individual panel parameters. As shown in a step 238, the user may select from a number of different geometric representations, including a two-dimensional flattened representation of the panel 114, as shown in FIG. 6, which displays very quickly, and a three-dimensional representation of the panel. After a row 198 of panels 114 is selected, specifications that may be modified from the default specifications in the default floatwall panel model 20 include leading edge 188 and trailing edge 190 rib 192 draft angles, posts 148 and axial ribs 286, grommets 154, and aft pins 288.

Referring to FIGS. 2, 3A and 4, in a step 240, circumferential ribs 192 are molded to the leading edge 188 and on or near the trailing edge 190 on the coldside 194 of panels 114. Ribs 192 are provided to stiffen the panels 114, and separate the panels from the attached shell 100, 102 while providing support to the panel. Rib draft angles apply to the panel 114 leading edge 188 rib 192 interior face 290, and the panel trailing edge 190 rib 192 interior face 292 and, if the panel is in an aft row 302 and aft pins 288 are present, an exterior face 294. The leading edge 188 of a panel 114 is defined by the program model software program 10 as the edge of the panel closest to the front A of the combustion chamber 30, while the trailing edge 190 is the edge closest to the aft end B of the combustion chamber. The rib draft angles specifications must not violate manufacturing process rules stored in the floatwall panel knowledge base, such as the rule requiring that ribs on the panels 114 be at such an angle as to allow removal of the panels from molds used in the manufacturing process.

Referring to FIGS. 4 and 6, in a step 242, the user may edit the default location and other parameters of posts 148 and axial ribs 286. Posts 148 are defined in sets 296, with the posts within the set aligned in the axial direction (A to B). For all the posts 148 on a panel 114 which are closest to the leading edge 188 of the panel 114, the posts' axial position is defined as an offset from leading edge. For all the posts 148 on a panel 114 which are closest to the trailing edge 190 of the panel 114, the posts' axial position is defined as an offset from trailing edge. Individual posts 148 within the set 296 may also be positioned relative to the leading edge 188 and trailing edge 190 as well as from the circumferential edge 184 of the panel 114. The posts 148 are mounted on the coldside 194 of the panels 114 and protrude through the slots 113 in the shells 100, 102. A shell slot radial clearance (not shown) defines the size of the slot 113 in the shell 100, 102 for the post 148.

Still referring to step 242, the number and location of axial ribs 286 may be entered and modified by the user on a GUI screen. Axial ribs 286 are located along the circumferential edges 184 of the panel 114. Supplemental axial ribs 286 for additional stiffening may be included by the product model software program 10 or by the user. The product model software program's 10 default specifications connect the supplemental axial ribs 286 and the post sets 296. These specifications may be modified by the user. In addition, supplemental axial ribs 286 may be rotated relative to an axial reference line 298 displayed on the geometric representation of the panel 114 by the product model software program 10.

Referring to FIGS. 4 and 6, in a step 244, grommet 154 specifications and locations may be edited, such as the diameter of the combustion and dilution holes 182 in the panel 114. Grommets 154 surround the combustion and dilution holes 182 in the panels 114 to strengthen and direct air flow through the combustion and dilution holes. The number of grommets 154 in a panel 114 is calculated based upon the number of fuel nozzles (not shown) and the number of panels in a row 198. Grommets 154 may be staggered relative to each other on a panel 114 and pitched relative to the surface 300 of the panel. Individual grommets 154 may be rotated relative to an axial reference line 298. The diameter of individual combustion and dilution holes 182 may be edited, and combustion and dilution holes may be moved an axial distance relative to the leading edge 188 or trailing edge 190 of the panel 114.

As shown in FIGS. 2, 4 and 6, in a step 250, only an aft row 302 of panels 114 may include the aft pins 288. The aft row 302 of panels 114 is the row closest to the aft end B of the combustion chamber 30. The aft pins 288 are placed in rows 304, and located in a pin region 306 which stretches circumferentially between the trailing edge 190 of the panel 114 and the aft stiffening rib 192. The axial length 308 of the pin region 306 may be edited by the user on the GUI screen, along with the distance the pin region is offset from the trailing edge 190 and the distance offset from the aft stiffening rib 192. The diameter of the aft pins 288 may be edited, along with the shape of the pins. Since a pin 288 may be a cone, the cone half angle may be edited to alter the shape of the pin. The location of the gage point (not shown) on each pin 288 for measuring the distance between pins may also be edited. The number of pins 288 in each row 304 may be edited, as well as the distance between each pin. Aft pins 288 within rows 304 are equally spaced in all directions, including between pins of the same and adjacent rows. The product model software program 10 displays on a GUI screen 120 an enlarged geometric representation of the rows 304 of aft pins 288 to aid in setting the row spacing.

In a step 252, the user may select other rows 198 of panels 114 to edit, and allows the user to repeat the previous eight steps 236, 238, 240, 242, 244, 246, 248, and 250. All panels 114 may be edited repeatedly until the desired result has been obtained.

Specifications unique to each panel row 198 are pre-programmed into the impingement film floatwall panel knowledge base. As mentioned above, the specification values of these characteristics typically comprise those relating to various gaps, thickness, lengths, depths, widths, etc. These specifications should be apparent to one of ordinary skill in the art. Some or all of these specification values may be default values and displayed to the user on the GUI screen for possible modification.

At this point, the user has completed entering the configuration and parameter specifications relating to the various structural features of the floatwall panel 114. The product model software program 10 creates an updated floatwall panels model 20 including the OD shell 100 and the ID shell 102 model which corresponds to the features of the impingement film floatwall panels model, such as combustion holes.

The ICAD system allows the user to perform various types of engineering analyses on the floatwall panel model 20 to assess various performance features of the design. As shown in a step 253, the user may select the Materials and Weight Report button (see button 134 of FIG. 4), and generate a materials and weight report 310 using the panels and shells model 20 (see FIG. 7). In this way, the user can assess the viability of the design chosen for the floatwall panels and shells model 20.

Referring to FIG. 7, in a step 254, an exemplary GUI input screen 120 is shown for a weight analysis 310 of the panel and shell model 20. The user enters various parameters that the weight analysis program 310 will use in its calculations. Specifically, the user, in a step 254, enters a value for the shell material 312. The user may select from a list of available materials or may define their own material by clicking on the User Defined button 314. The user may then enter the type of shell material and the material's density. Next, in a step 256, the user enters a value for the panel material 316. The user may select from a list of available materials or may define their own material by clicking on the User Defined button 318. The user may then enter the type of panel material and the material's density.

Once these parameters have been entered, in a step 258, the weight analysis program 310 calculates the ID shell's 100 volume and weight, and the OD shell's 102 volume and weight. The ID panel's 114 volume and weight, and the OD panel's volume and weight are also calculated. These calculations are based on the default and modified panel parameters and panel configuration previously entered into the product model software program 10, along with the calculated shell geometry, and the shell and panel material entered in the weight analysis program 310. The results of the volume and weight analysis of the floatwall panel model 20 are displayed on the GUI screen 120.

In further accord with the present invention, the product model software program 10 allows the user to modify any portion of the geometry of the panels and shells model 20. This can be done any time after the default model 20 geometry has been created by the ICAD system. If the user is not satisfied with the results of the weight analysis report or any other features of the floatwall panels and shells model 20, the user can return to any step in the design process to modify the floatwall panel model. When changing the various floatwall panel specifications, as previously noted, the program advises the user if any design rules stored in the floatwall panel knowledge base have been violated such that the floatwall panels may not be able to satisfy design requirements which were preprogrammed in the floatwall panel knowledge base or entered by the user during the design of the floatwall panel model 20. The user may make the desired changes to the model in the steps 201 to 252.

The resulting floatwall panel model 20 may be analyzed and a geometric representation of the floatwall panel model viewed at any time and further modified, if desired. Once the user is satisfied with the resulting floatwall panels and shells model 20, a design report, various non-parametric Unigraphics CAD input files, and parametric interface input files are created. The program then ends in a step 268.

Referring to FIG. 4, in a step 259, the user selects the UG Output button 136, and in a step 260, the user selects or enters on the GUI screen the directory and filenames for creating part files to input to the Unigraphics CAD system to create a non-parametric model. The user selects specific geometric sections of the floatwall panels and shells model 20 to output to the part files, such as all two-dimensional or three-dimensional model parts, or only a particular ID row 198 or a particular OD panel 114. The program then commands the ICAD system to create, in a step 262, the above-specified non-parametric Unigraphics CAD input files for the selected sections of the panels and shells model 20. The non-parametric model created in the CAD system may not be easily altered, and so it is of limited use. However, drawings based on the model are useful, along with other functions of the Unigraphics system which are not provided by the ICAD system.

Still referring to FIG. 4, in a step 263, the user selects the PWModel Output button 138 for the GUI screen 120 to create a parametric CAD model of the floatwall panels and shells model 20. In a step 264, the user selects from the GUI screen a directory pathname. The directory pathname specifies a location within the workstation 162, or other computer, for the product model software program 10 to store output files, such as the parametric interface input files that are to be created by the product model software program 10. The user may accept the default directory pathname 124 or the pathname may be changed by selecting a new pathname from a list of pathnames. The user selects the geometric components of the model to output from a list on the GUI screen, such as only a particular ID row 198 or the particular OD shell 102. The program then commands the ICAD system to calculate, in a step 266, the specification values for the selected geometric components of the panel model. These values are calculated from the user-entered configuration and parameter data, and from the stored default values and rules relating to various physical limits placed on the data values.

The parametric interface input files that are created and written by the ICAD system may then be input into another computer program. These ICAD system files contain a listing of the floatwall panels and shells model 20 data including geometric configurations, specifications and parameters, together with the corresponding Boolean operations (i.e., the floatwall panels and shells model update commands of "unite", "subtract" and "intersect"). These operations integrate the data into the panels and shells model that will reside in the Unigraphics CAD system. These files are output by the product model software program 10 of FIG. 4. The additional program (hereinafter referred to as "PWMODEL") essentially functions as an interface and translator between the ICAD system and the Unigraphics CAD system.

Both PWMODEL and the Unigraphics CAD system may be installed and executed within the same workstation 162 as that of the ICAD system. Specifically, PWMODEL uses the ICAD system panel model geometric data and commands to generate, or recreate, a similar parametric model of the panels and shell 20 that is used within Unigraphics. This is done to overcome the inherent shortcomings (i.e., the incompatibilities between the ICAD system and the Unigraphics CAD system) of each system discussed above in the "Background Art" section.

The product model software program 10 also creates a design report which is a text file that lists the various specifications and parameters relating to the physical features or elements of the floatwall panels and shells model 20 along with the values assigned to those specifications and parameters by the program (including both user-selected parameter values and pre-programmed default parameter values). The report lists geometric information about the floatwall panels and shells model 20 in terms of specification and parameter values for each feature.

Although the present invention has been shown and described with respect to the detailed embodiments thereof, it will be understood by those skilled in the art that various changes in the form and detail thereof, such as implementing the present invention with other software besides the aforementioned expert system, may be made without departing from the claimed invention.

What is claimed is:

1. A method of designing an impingement film floatwall panel system model for a combustion chamber for a gas turbine engine, comprising the steps of:
    creating signals representing an impingement film floatwall panel knowledge base of information having a plurality of design rule signals with respect to a corresponding plurality of parameter signals of associated elements of impingement film floatwall panels, wherein the knowledge base comprises at least one data value signal for each one of the plurality of design rule signals;
    entering a data value signal for a selected one of the plurality of parameter signals of an associated element of the impingement film floatwall panels;
    comparing the entered data value signal for the selected one of the plurality of parameter signals with the corresponding at least one data value signal in the knowledge base for the corresponding one of the plurality of design rule signals; and
    creating signals representative of a geometric representation of the selected one of the plurality of parameter signals of the associated element of the impingement film floatwall panels if the result of the step of comparing is such that the entered data value signal for the selected one of the plurality of parameter signals is determined to have a first predetermined relationship with respect to the corresponding at least one data value signal in the knowledge base for the selected one of the plurality of design rule signals.

2. The method of claim 1, wherein the step of creating the signals representative of a geometric representation of the selected one of the plurality of parameter signals of the associated element of the impingement film floatwall panels further comprises the step of updating signals representing the model of the impingement film floatwall panel system with the selected one of the plurality of parameter signals of the associated element of the impingement film floatwall panels.

3. The method of claim 1, further comprising the step of modifying the entered data value signal for the selected one of the plurality of parameter signals if the result of the step of comparing is such that the entered data value signal for the selected one of the plurality of parameter signals is determined to have a second predetermined relationship with respect to the corresponding at least one data value signal in the knowledge base for the selected one of the plurality of design rule signals.

4. The method of claim 3, further comprising the steps of:
    comparing the modified data value signal for the selected one of the plurality of parameter signals with the corresponding at least one data value signal in the impingement film floatwall panel knowledge base for the corresponding one of the plurality of design rule signals; and
    creating signals representative of a second geometric representation of the selected one of the plurality of parameter signals of the associated element of the impingement film floatwall panels if the result of the step of comparing is such that the modified data value signal for the selected one of the plurality of parameter signals is determined to be of the first predetermined relationship with respect to the corresponding at least one data value signal in the knowledge base for the corresponding one of the plurality of design rule signals.

5. The method of claim 1, further comprising the step of storing the signals representative of the created knowledge base of information.

6. The method of claim 1, further comprising the step of displaying the signals representative of the created geometric representation of the selected one of the plurality of parameter signals of the associated element of the impingement film floatwall panels.

7. The method of claim 1, further comprising the step of generating shell of a combustion chamber design signals representing a model of a shell, including aligning elements of the model of the shell with signals representing elements of a model of a panel.

8. The method of claim 7, wherein the step of aligning elements includes aligning panel combustion and dilution holes with shell combustion and dilution holes.

9. The method of claim 1, further including the steps of:
    receiving signals representing flowpath parameters for entering aerodynamic and thermodynamic parameter signals; and
    creating a default geometric representation of the impingement film floatwall panels utilizing the flowpath parameter signals and the design rule signals.

10. The method of claim 1, further comprising the step of analyzing the signals representative of the geometric representation of the selected one of the plurality of parameter signals of the associated element of the impingement film floatwall panels.

11. The method of claim 10, wherein the step of analyzing the signals representative of the geometric representation of the selected one of the plurality of parameter signals of the selected element of the impingement film floatwall panels further comprises the step of performing a weight analysis on the signals representative of the geometric representation of the selected one of the plurality of parameter signals of the associated element of the impingement film floatwall panels.

12. The method of claim 1, wherein the step of creating the signals representative of the geometric representation of the selected one of the plurality of parameter signals of the associated element of the floatwall panels further comprises the step of creating signals representative of the model of the floatwall panels.

13. The method of claim 1, wherein the at least one data value signal for each one of the plurality of design rule signals in the knowledge base comprises a numerical value.

14. The method of claim 1, wherein the at least one data value signal for each one of the plurality of design rule signals in the knowledge base comprises a range of values.

15. The method of claim 1, wherein the step of entering a desired data value signal for a selected one of the plurality of parameter signals of a selected element of the floatwall panels comprises the steps of:
- making available at least one data value signal for each one of the plurality of parameter signals of the selected element of the floatwall panels; and
- selecting a desired data value signal for the selected one of the plurality of parameter signals of the selected element of the floatwall panel from the made available at least one data value signal for each one of the plurality of parameter signals of the selected element of the floatwall panel.

16. The method of claim 15, wherein the step of making available at least one data value signal for each one of the plurality of parameter signals of the selected element of the floatwall panel comprises the step of providing a visual display containing signals representative of a graphic depiction of the at least one data value signal for each one of the plurality of parameter signals of the selected element of the floatwall panel.

17. The method of claim 1, further comprising the step of providing a file listing of a selected one or more of the plurality of parameter signals of the impingement film floatwall panels, wherein the file listing includes at least one of the entered data value signals for each one of the corresponding plurality of parameter signals of the impingement film floatwall panel, wherein the file listing represents a parametrical listing of each element of the signals representing the model of the impingement film floatwall panel.

18. The method of claim 17, wherein the step of providing a file listing of a selected one or more of the plurality of parameter signals of the impingement film floatwall panels further comprises the step of providing the file listing as an output from a knowledge-based engineering system.

19. A computerized system for designing an impingement film floatwall panel system for a combustion chamber of a gas turbine engine, comprising:
- an impingement film floatwall panel knowledge base for storing a plurality of impingement film floatwall panel design parameter signals corresponding to a plurality of design rule signals for creating a geometric representation of an impingement film floatwall panel;
- selection means for receiving a parameter value signal corresponding to at least one of the design parameter signals;
- processing means for comparing the parameter value signal with the at least one of the design parameter signals stored in the knowledge base; and
- means for creating the geometric representation of the impingement film floatwall panel if the parameter value signal has a first predetermined relationship with the design parameter signal and at least one of the design rule signals.

20. A computerized system for designing an impingement film floatwall panel system for a combustion chamber of a gas turbine engine, comprising:
- an impingement film floatwall panel knowledge base including a plurality of design rule signals for generating impingement film floatwall panel model configuration signals, wherein each of the design rule signals has a first relationship with at least one of a plurality of design parameter signals;
- input means for receiving a design parameter value signal corresponding to one of the plurality of design parameter signals;
- evaluation means for comparing the design parameter value signal with the plurality of design rule signals;
- adjustment means for modifying impingement film floatwall panel model configuration signals utilizing the design parameter value signal and the plurality of design rule signals; and
- creation means for generating signals representative of a geometric representation of the impingement film floatwall panel model configuration signals.

21. The computerized system of claim 20, wherein the design parameter signals include flowpath parameter signals received from the input means.

22. The computerized system of claim 21, further including means, utilizing the design rule signals, for creating the impingement film floatwall panel model configuration signals utilizing the flowpath parameter signals.

23. The computerized system of claim 20, further including:
- cautionary means for generating a warning signal if the parameter value signal does not satisfy the plurality of the design rule signals; and
- means for displaying the warning signal.

24. The computerized system of claim 20, further including:
- panel material parameter signals received from the input means;
- shell material parameter signals received from the input means; and
- means for generating weight signals for a panel model and a shell model utilizing shell material parameter signals and panel material parameter signals and impingement film floatwall panel model configuration signals.

25. The computerized system of claim 20, wherein the design parameter signals include performance parameter signals for generating analysis signals of the impingement film floatwall panel model configuration signals, and manufacturing parameter signals for establishing manufacturing constraints and preferences for the impingement film floatwall panel model configuration signals.

* * * * *

UNITED STATES PATENT AND TRADEMARK OFFICE
CERTIFICATE OF CORRECTION

| | | |
|---|---|---|
| PATENT NO. | : 6,973,419 B1 | Page 1 of 1 |
| APPLICATION NO. | : 09/517567 | |
| DATED | : December 6, 2005 | |
| INVENTOR(S) | : Thomas B. Fortin et al. | |

It is certified that error appears in the above-identified patent and that said Letters Patent is hereby corrected as shown below:

On the title page item (75), Inventor "Keith C. Belson" should be --Keith C. Belsom--.

Signed and Sealed this

Sixteenth Day of December, 2008

JON W. DUDAS
*Director of the United States Patent and Trademark Office*